(12) United States Patent
Liu

(10) Patent No.: US 9,837,028 B2
(45) Date of Patent: Dec. 5, 2017

(54) LIQUID CRYSTAL DISPLAY PANEL WITH AT LEAST TWO SCAN LINES FOR EACH LINE OF PIXELS AND RELIEVED HORIZONTAL CROSSTALK

(71) Applicant: SHENZHEN CHINA STAR OPTOELECTRONICS TECHNOLOGY CO., LTD., Shenzhen (CN)

(72) Inventor: Huan Liu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,373

(22) PCT Filed: Oct. 22, 2014

(86) PCT No.: PCT/CN2014/089170

§ 371 (c)(1),
(2) Date: Jan. 22, 2015

(87) PCT Pub. No.: WO2016/049954

PCT Pub. Date: Apr. 7, 2016

(65) Prior Publication Data

US 2017/0200425 A1 Jul. 13, 2017

(30) Foreign Application Priority Data

Sep. 29, 2014 (CN) .......................... 2014 1 0515115

(51) Int. Cl.
*G09G 3/36* (2006.01)
*G02F 1/1362* (2006.01)

(52) U.S. Cl.
CPC ..... *G09G 3/3614* (2013.01); *G02F 1/136286* (2013.01); *G09G 3/3648* (2013.01);
(Continued)

(58) Field of Classification Search
CPC ............... G09G 3/3614; G09G 3/3684; G09G 2320/0209; G02F 1/136286; G02F 2201/121
See application file for complete search history.

(56) References Cited

U.S. PATENT DOCUMENTS

2005/0190138 A1 9/2005 Jung
2006/0034125 A1\* 2/2006 Kim ..................... G09G 3/3648
365/185.22
(Continued)

FOREIGN PATENT DOCUMENTS

CN        1677476 A     10/2005
CN     201069506 Y      6/2008
(Continued)

OTHER PUBLICATIONS

Office Action dated Feb. 1, 2016, by the State Intellectual Property Office of China in corresponding Chinese Patent Application No. 201410515115.4. (7 pages).
(Continued)

*Primary Examiner* — Liliana Cerullo
(74) *Attorney, Agent, or Firm* — Buchanan Ingersoll & Rooney PC

(57) ABSTRACT

A liquid crystal display panel and a liquid crystal display comprising the same are disclosed. The liquid crystal display panel comprise: a plurality of pixels configured in an array, which is formed by a plurality of data lines and a plurality of scan lines that are arranged perpendicularly with respect to the plurality of data lines. The plurality of scan lines comprise: at least two scan lines arranged in correspondence with each line of pixels, the at least two scan lines being alternately connected to each successive pixel located in a corresponding line, wherein each line of pixels is scanned in a plurality of individual time periods. During each time period, when pixel drive signals are input into pixels connected to one of the at least two scan lines via corresponding data lines, the sum of the variation of the pixel drive signals and the variation of input signals of data lines corresponding to pixels connected to the rest of the at least two scan lines equals 0, so that a common electrode voltage will not deviate from a pre-determined voltage. As a result, the phenomenon (Continued)

of deviation generated due to couplings of the common-electrode voltage to data lines can be largely relieved, thus eliminating the phenomenon of horizontal crosstalk caused thereby in the prior art.

10 Claims, 4 Drawing Sheets

(52) U.S. Cl.
CPC ... *G02F 2201/121* (2013.01); *G09G 2310/08* (2013.01); *G09G 2320/0209* (2013.01)

(56) References Cited

U.S. PATENT DOCUMENTS

| | | |
|---|---|---|
| 2009/0096943 A1 | 4/2009 | Uehara et al. |
| 2009/0160832 A1 | 6/2009 | Lee |
| 2009/0322660 A1 | 12/2009 | Chung et al. |
| 2010/0079363 A1 | 4/2010 | Chung et al. |
| 2010/0110114 A1* | 5/2010 | Hashimoto .......... G09G 3/3614 345/691 |
| 2014/0125571 A1 | 5/2014 | Um et al. |

FOREIGN PATENT DOCUMENTS

| | | |
|---|---|---|
| CN | 101308271 A | 11/2008 |
| CN | 101382714 A | 3/2009 |
| CN | 101464602 A | 6/2009 |
| CN | 101901579 A | 12/2010 |
| CN | 102929054 A | 2/2013 |
| CN | 104062792 A | 9/2014 |
| KR | 10-2014-0079089 A | 6/2014 |

OTHER PUBLICATIONS

International Search Report (Forms PCT/ISA/210 and PCT/ISA/220) and the Written Opinion (Form PCT/ISA/237) dated Jun. 12, 2015, by the State Intellectual Property Office of China acting as the International Searching Authority in corresponding International Application No. PCT/CN2014/089170. (12 pages).

* cited by examiner (a)

(b)

(c)

LIQUID CRYSTAL DISPLAY PANEL WITH AT LEAST TWO SCAN LINES FOR EACH LINE OF PIXELS AND RELIEVED HORIZONTAL CROSSTALK

The present application claims benefit of Chinese patent application CN 201410515115.4, entitled "Liquid crystal display panel and liquid crystal display comprising the same" and filed on Sep. 29, 2014, the entirety of which is incorporated herein by reference.

FIELD OF THE INVENTION

The present disclosure relates to the technical field of liquid crystal displays, and in particular, to a liquid crystal display panel and a liquid crystal display comprising the liquid crystal display panel.

BACKGROUND OF THE INVENTION

In the field of thin film transistor liquid crystal displays (TFT-LCDs), in order to overcome DC blocking effects of an alignment film as well as to enable directional polarization of liquid crystals, it is necessary to drive the liquid crystals in a polarity reversion drive mode. Among others, column reversion drive mode is generally used in large-size panels due to power-saving features and high charging rates thereof.

In the column reversion drive mode, reversion between positive and negative polarities of corresponding sub-pixels on two adjacent data lines is performed by column. With this drive mode, a phase difference $\pi$ would be generated between the blink waveforms of two adjacent columns, thus restraining blinking to some degree.

FIG. 1 shows a structural diagram of a liquid crystal display panel in the prior art, in which a drive structure using the column reversion drive mode is indicated. As FIG. 1 depicts, when a scan signal is input, TFTs connected to a corresponding scan line are all activated, and pixel drive signals of data lines are stored in storage capacitors Cst and liquid crystal capacitors Clc within corresponding pixels. Subsequently, the TFTs connected to this scan line are all deactivated, while TFTs connected to a next scan line are all activated, such that the voltages of the data lines are changed into data voltages required by the corresponding pixels located on said next scan line.

However, existence of parasitic capacitors Cpc between the data lines and an upper-plate common electrode and between the data lines and a lower-plate common electrode would influence the waveform of a common-electrode voltage Vcom under the action of capacitive coupling effects. As a result, the waveform of the common-electrode voltage Vcom would deviate from a pre-determined DC waveform (see FIG. 2(c)). When the pixel electrodes connected to a scan line store pixel signals via the data lines, if the common-electrode voltage Vcom deviates from the pre-determined voltage under the action of coupling effects of the data lines, a voltage difference between two ends of the liquid crystals for displaying the pixels connected to the scan line will deviate from a pre-determined value. Consequently, the pixels cannot be displayed with expected grayscales, thus generating the phenomenon of horizontal crosstalk (see FIG. 3).

Some existing display panels use a 1G2D framework for a low color shift design, in which a main area and a sub-area of a pixel are charged via two data lines of opposite polarities respectively. This design, although can attenuate coupling effects between the data lines and the common electrode, would generate coupling effects therebetween to a certain degree also, due to not only a design requirement but also an influence of a feed through voltage. Hence, deviation of the common-electrode voltage would occur. Therefore, the 1G2D framework would still cause the phenomenon of horizontal crosstalk due to a coupled common electrode.

SUMMARY OF THE INVENTION

One of the technical problems to be solved by the present disclosure is to provide a liquid crystal display panel that can relieve the phenomenon of horizontal crosstalk. In addition, the present disclosure further provides a liquid crystal display comprising the liquid crystal display panel.

In order to solve the above technical problems, the present disclosure provides a liquid crystal display in an embodiment at the outset, comprising: a plurality of pixels configured in an array, which is formed by a plurality of data lines and a plurality of scan lines that are arranged perpendicularly with respect to the plurality of data lines. The plurality of scan lines comprise: at least two scan lines arranged in correspondence with each line of pixels, the at least two scan lines being alternately connected to each successive pixel located in a corresponding line. Each line of pixels is scanned in a plurality of individual time periods. During each time period, when pixel drive signals are input into pixels connected to one of the at least two scan lines via corresponding data lines, the sum of the variation of the pixel drive signals and the variation of input signals of data lines corresponding to pixels connected to the rest of the at least two scan lines equals zero, so that a common electrode voltage will not deviate from a pre-determined voltage.

Preferably, the at least two scan lines are arranged successively in parallel with each other from the top down, and are alternately connected, in an order as arranged, to each successive pixel located in a corresponding line.

Preferably, two scan lines are provided for each line of pixels, and the scan time for each line of pixels comprises two time periods, during which, when pixel drive signals are input into pixels connected to either of the two scan lines via corresponding data lines in each time period, the sum of input signals of data lines corresponding to pixels connected to the other of the two scan lines has a same amplitude but an opposite polarity with respect to the sum of the pixel drive signals.

Preferably, either of the two scan lines corresponding to a line of pixels is connected to odd-numbered pixels located in said line of pixels, while the other of the two scan lines is connected to even-numbered pixels located in said line of pixels.

Preferably, the liquid crystal display panel can be driven through a column reversion drive mode, a line reversion drive mode, a frame reversion drive mode, and a dot reversion drive mode.

The present disclosure further provides a liquid crystal display in an embodiment, comprising the liquid crystal display panel as described above.

Compared with the prior art, one or more embodiments of the above solutions can bring about the following advantages or beneficial effects.

According to embodiments of the present disclosure, a liquid crystal display panel is provided, wherein at least one scan line is added for each line of pixels, i.e., at least two scan lines are provided for each line of pixels. The at least two scan lines are alternately connected to each successive pixel located in a corresponding line, and each line of pixels is scanned in a plurality of individual time periods. During each time period, when pixel drive signals are input into pixels connected to one of the at least two scan lines via corresponding data lines, the sum of the variation of the pixel drive signals and the variation of input signals of data lines corresponding to pixels connected to the rest of the at least two scan lines equals zero, so that a common electrode voltage will not deviate from a pre-determined voltage. As a result of this, the phenomenon of deviation generated due to couplings of a common-electrode voltage to data lines can be largely relieved, thus eliminating the phenomenon of horizontal crosstalk caused thereby in the prior art.

Other features and advantages of the present disclosure will be further explained in the following description, and partly become self-evident therefrom, or be understood through implementing the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

The present disclosure will be explained by reference to the following detailed description of embodiments taken in connection with the accompanying drawings, whereby it can be readily understood how to solve the technical problem by the technical means according to the present disclosure and achieve the technical effects thereof, and thus the technical solution according to the present disclosure can be implemented. It is important to note that as long as there is no conflict, combinations of the above-described embodiments and of technical features therein are possible, and technical solutions obtained in this manner are intended to be within the scope of the present disclosure.

In order to solve the problem of horizontal crosstalk that might be generated during display of a liquid crystal display panel, a liquid crystal display panel is provided in the embodiments of the present disclosure, wherein at least one scan line is added for each line of pixels, i.e., at least two scan lines are provided for each line of pixels. The at least two scan lines are alternately connected to each successive pixel located in a corresponding line, and each line of pixels is scanned in a plurality of individual time periods. During each time period, when pixel drive signals are input into pixels connected to one of the at least two scan lines via corresponding data lines, the sum of the variation of the pixel drive signals and the variation of input signals of data lines corresponding to pixels connected to the rest of the at least two scan lines equals zero, so that a common electrode voltage will not deviate from a pre-determined voltage. As a result of this, the phenomenon of deviation generated due to couplings of a common-electrode voltage to data lines can be largely relieved, thus eliminating the phenomenon of horizontal crosstalk caused thereby in the prior art.

Embodiment

Figure 4:
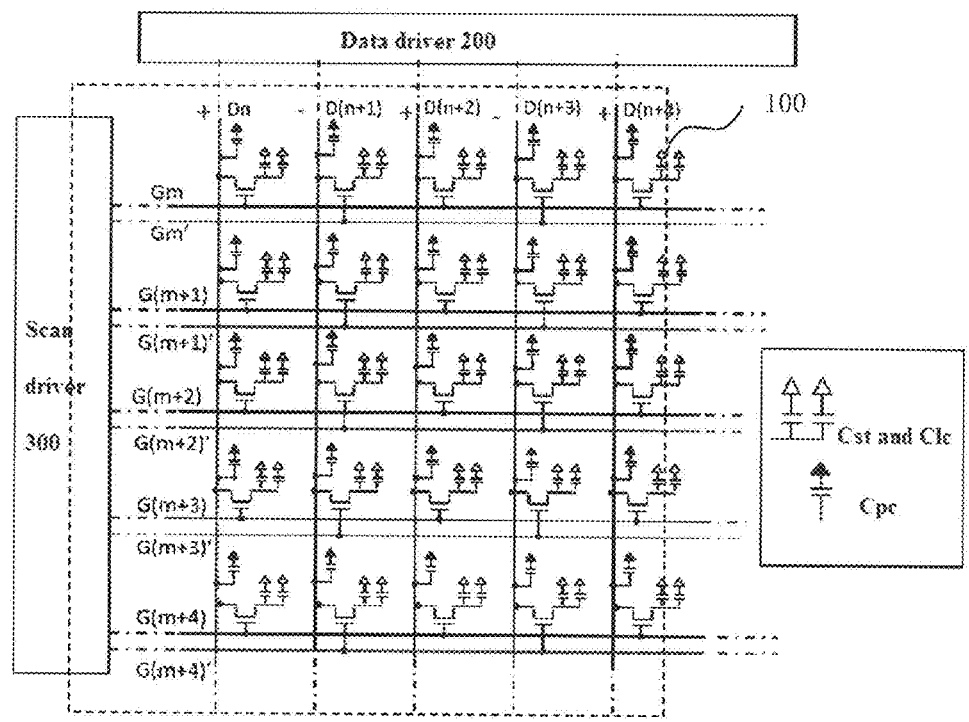
FIG. 4 shows a structural diagram of a liquid crystal display panel according to an embodiment of the present disclosure.

FIG. 4 shows a structural diagram of a liquid crystal display panel according to an embodiment of the present disclosure. As indicated in FIG. 4, the display panel comprises an image display area 100, a data driver 200, and a scan driver 300. The image display area 100 comprises an array (also termed as a pixel area) formed by a plurality of data lines (e.g., Dn, D(n+1) as shown in the figure) and a plurality of scan lines (e.g., Gm, Gm' as shown in the figure) that are arranged perpendicularly with respect to the plurality of data lines, and a plurality of pixels arranged in the array. The data driver 200 can transmit pixel drive signals that have been provided to the image display area 100 via the plurality of data lines coupled thereto, and the scan driver 300 can transmit scan signals that have been provided to the image display area 100 via the plurality of scan lines coupled thereto.

The liquid crystal display panel according to the embodiment of the present disclosure will be described in detail below. As FIG. 4 shows, the plurality of scan lines according to the embodiment of the present disclosure include two scan lines arranged in correspondence with to each line of pixels, which are respectively termed as a first scan line and a second scan line herein for the sake of convenience. Of the two scan lines, the first scan line and the second scan line are alternately connected to each successive pixel located in a corresponding line. That is, the first scan line is connected to the odd-numbered (or even-numbered) pixels located in the corresponding line, while the second scan line is connected to the even-numbered (or odd-numbered) pixels located in the corresponding line. Through this configuration, liquid crystal display panels can be manufactured with reduced complexity, and the layout of panels can be provided with enhanced homogeneity. Moreover, scan lines can be driven in a simplified configuration.

With reference to a first line of pixels, a first scan line Gm and a second scan line Gm' are provided for this line of pixels. As indicated in FIG. 4, the scan line Gm is, through corresponding TFTs, connected to storage capacitors Cst and liquid crystal capacitors Clc of odd-numbered pixels located in the line, while the scan line Gm' is, through corresponding TFTs, connected to storage capacitors Cst and liquid crystal capacitors Clc of even-numbered pixels located in the line. Certainly, the scan line Gm can be, through corresponding TFTs, connected to the storage capacitors Cst and liquid crystal capacitors Clc of even-numbered pixels located in the line, and the scan line Gm' can be, through corresponding TFTs, connected to storage capacitors Cst and liquid crystal capacitors Clc of odd-numbered pixels located in the line also.

As FIG. 4 shows, compared with an ordinary liquid crystal display panel in the prior art, in the embodiment of the present disclosure, an additional scan line is provided for each line of pixels. That is, each line of pixels corresponds to two scan lines, and will be scanned in two individual time periods. During each time period, when pixel drive signals are input into pixels connected to either of the two scan lines via corresponding data lines, the sum of input signals of data lines corresponding to pixels connected to the other of the two scan lines is of a same amplitude but an opposite polarity with respect to the sum of the pixel drive signals.

With reference to the first line of pixels, two scan lines Gm and Gm' are provided for this line of pixels, wherein the scan lines Gm and Gm' are alternately connected to each successive pixel located in the line. This line of pixels is scanned in two individual time periods. During a first time period, a scan signal is exerted on the scan line Gm, and the TFTs connected to the scan line Gm are all activated, while the TFTs connected to the scan line Gm' are all deactivated. At this moment, the pixels connected to the scan line Gm are all being charged via corresponding data lines, and the data lines corresponding to the other pixels that are located in the line and connected to the scan line Gm' are each exerted with a voltage (pixel drive signal) of a same amplitude but an opposite polarity with respect to the voltage of an adjacent data line. Subsequently, during a second time period, a scan signal is exerted on the scan line Gm', and the TFTs connected to the scan line Gm' are all activated, while the TFTs connected to the scan line Gm are all deactivated. At this moment, the pixels connected to the scan line Gm' are being charged via corresponding data lines, and the data lines corresponding to the other pixels that are located in the line and connected to the scan line Gm are each exerted with a voltage of a same amplitude but an opposite polarity with respect to the voltage of an adjacent data line. Through this operation manner, both the sum voltage of every two adjacent data lines, and the sum voltage variation thereof are enabled to be zero at any moment.

In the following, reference will be made to voltages written into the data lines of pixels to explain the display effects that can be generated respectively by an existing liquid crystal display panel and the display panel according to the embodiment of the present disclosure.

(1) The phenomenon of horizontal crosstalk would be generated in a picture displayed by the existing liquid crystal display panel.

The phenomenon of horizontal crosstalk generated due to couplings of a common-electrode voltage Vcom to data lines will be demonstrated by the phenomenon of horizontal crosstalk in a common reload picture as an example. This picture has a low-grayscale background, and a window in the middle thereof which is a reload picture of the liquid crystal display panel, wherein the reload picture has the same positive polarity voltage waveform and the same negative polarity voltage waveform within a same frame.

In a certain frame, the voltage waveforms of two adjacent data lines Dn and D(n+1) in the above window are illustrated in FIGS. 2(a) and 2(b), respectively. The voltage of the data line Dn (hereinafter referred to as the voltage of Dn in short) and the voltage of the data line D(n+1) (hereinafter referred to as the voltage of D(n+1) in short) are of positive polarity and negative polarity in this frame, respectively.

During a period from t1 to t3, the voltages of Dn and D(n+1) remain constant as M1 and −N2, respectively, and the voltage Vcom is kept unchanged also.

Figure 1:
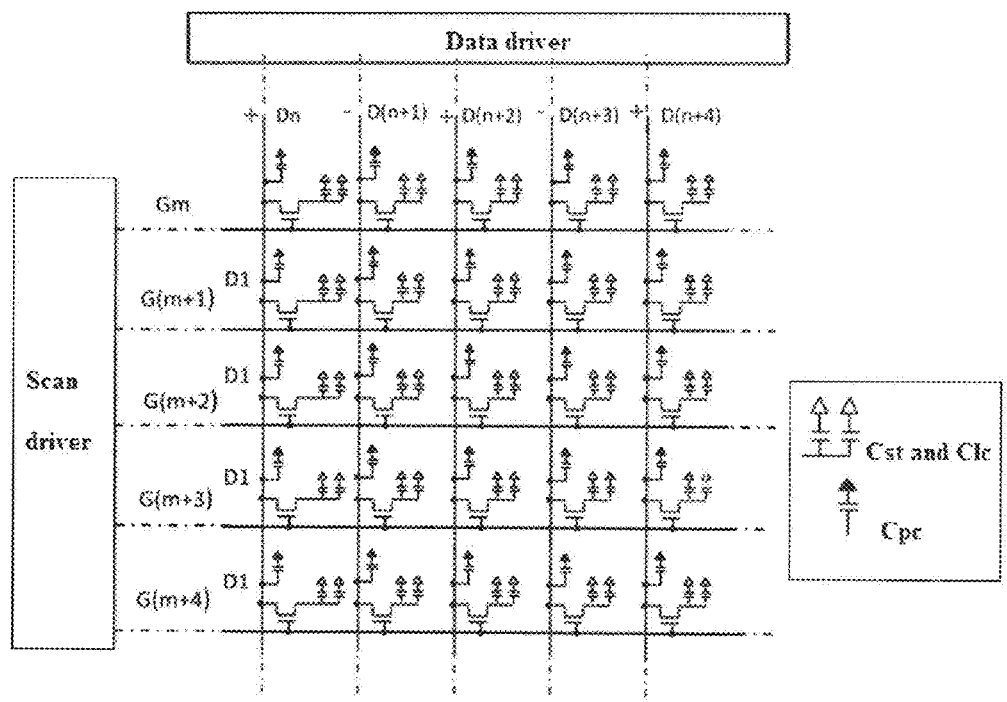
FIG. 1 shows a structural diagram of a liquid crystal display panel in the prior art.
Figure 2:
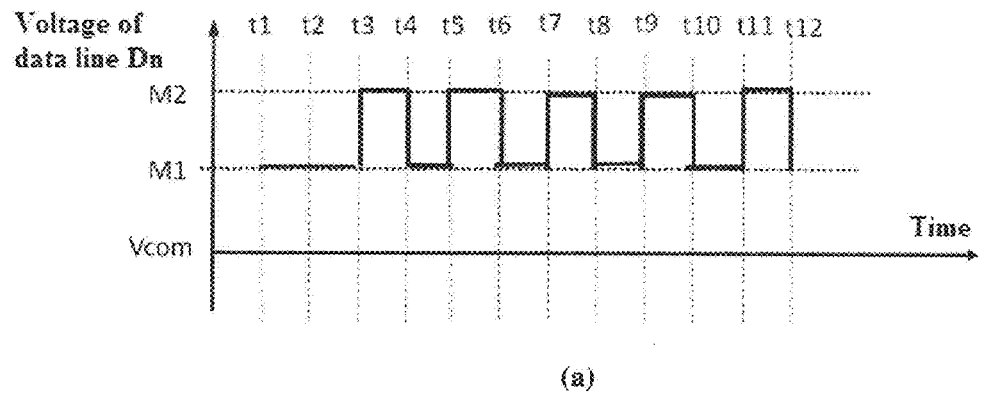
FIGS. 2 (a), 2(b), and 2(c) respectively show a voltage waveform of a data line Dn, a voltage waveform of a data line D(n+1), and a waveform diagram of a common-electrode voltage Vcom with deviation generated by coupling effects.
Figure 2:
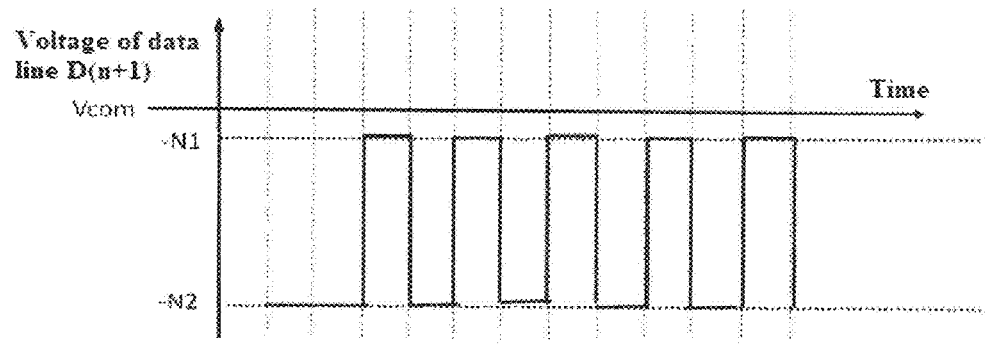
Figure 2:
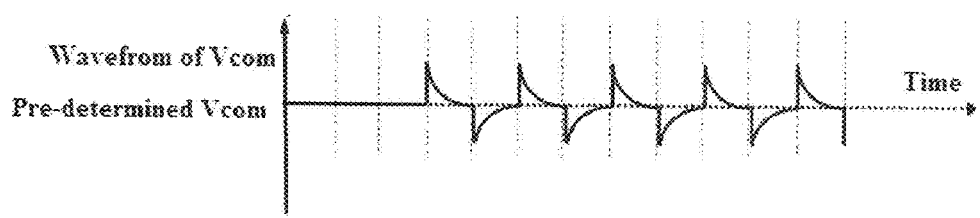
Figure 3:
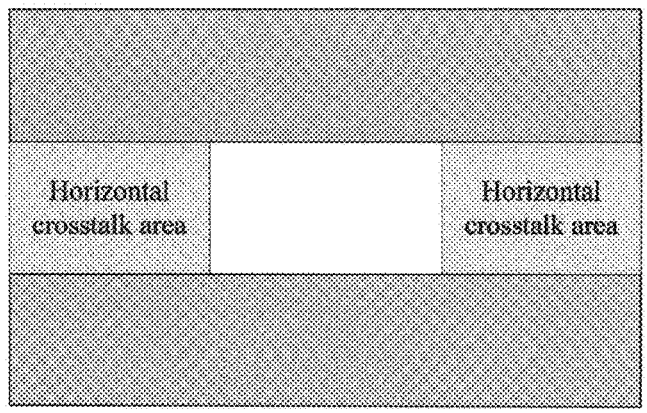
FIG. 3 shows an example graph of horizontal crosstalk in an existing liquid crystal display.

At the moment of t3, the voltage of Dn is suddenly increased to M2 from M1, while the voltage of D(n+1) is suddenly increased to −N1 from −N2. The simultaneous voltage rises of Dn and D(n+1) generate parasitic capacitors Cpc (see FIG. 1) between the data lines and the common electrode, and the coupling effects of the parasitic capacitors Cpc would pull up the common-electrode voltage Vcom also at this moment, as FIG. 2 shows.

Similarly, at the moment of t4, the voltage of Dn is suddenly decreased to M1 from M2, while voltage of D(n+1) is suddenly increased to −N2 from −N1. The simultaneous voltage drops of Dn and D(n+1) would pull down the common-electrode voltage Vcom, as FIG. 2 shows.

When this reload picture is being displayed, the waveforms of positive polarity voltages are all similar to the waveform of the voltage of Dn, and the waveforms of negative polarity voltages are all similar to the waveform of the voltage of D(n+1). Therefore, voltages of data lines can all cause the common electrode voltage Vcom to be pulled up or pulled down. As a result of this, deviation of the common electrode voltage Vcom in the panel will occur, thus generating the phenomenon of horizontal crosstalk.

It should be noted that, although this reload picture has been explained as an example herein, the phenomenon of crosstalk does not occur in this type of pictures only. As a matter of fact, at any moment, a non-zero variation of the voltage of the data lines within a certain region would cause the phenomenon of deviation caused by couplings of a common-electrode voltage Vcom in the region to the data lines.

(2) The liquid crystal display panel according to the embodiment of the present disclosure can effectively eliminate the phenomenon of horizontal crosstalk.

Figure 5:
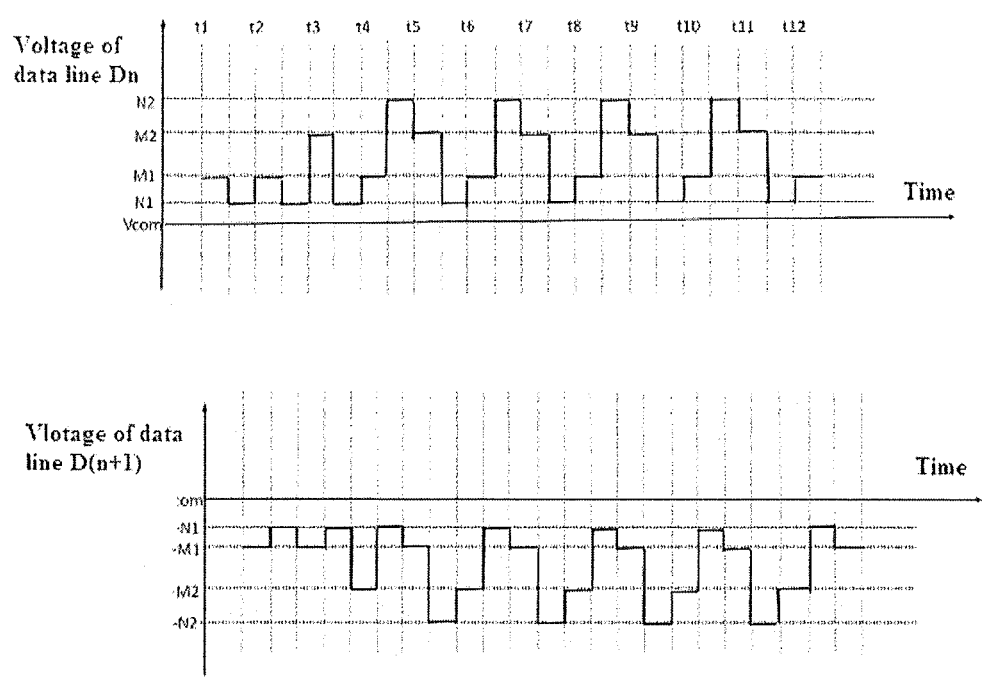
FIG. 5 shows waveforms of a voltage of data line Dn, a voltage of data line D(n+1), and a common-electrode voltage that are exerted on the liquid crystal display of FIG. 4 in a reload picture.

Reference can be made to two adjacent data lines Dn and D(n+1). As FIG. 5 shows, at the moment of t1, when a scan-line signal is exerted on the scan line Gm, a pixel electrode connected to the scan line Gm will be charged through the corresponding data line Dn, wherein the voltage of the data line Dn is a pre-determined voltage M1 of the pixel. At this moment, a voltage −M1 which is of a same amplitude but an opposite polarity with respect to voltage M1 is exerted on the adjacent data line D(n+1). Since the TFT connected to the data line D(n+1) is in an inactive state, the voltage of the data line D(n+1) at this moment will not be written into the pixel.

Next, when a scan-line signal is exerted on a scan line Gm', a pixel electrode connected to the scan line Gm' will be charged through the corresponding data line D(n+1), wherein the voltage of the data line D(n+1) is a pre-determined voltage −N1 of the pixel. At this moment, a voltage N1 which is of a same amplitude but an opposite polarity with respect to voltage −N1 is exerted on the adjacent data line Dn. Similarly, since the TFT connected to the data line Dn is in an inactive state, the voltage of the data line Dn at this moment will not be written into the pixel.

Subsequently, scan lines G(m+1), G(m+1)', and the like are successively enabled. The data lines Dn and D(n+1) are exerted with voltages in similar manners as described above, and corresponding pixels are charged via the data lines Dn and D(n+1) alternately.

In the embodiment as shown in FIG. 5, both the sum voltage of the data lines Dn and D(n+1), and the sum voltage variation of the data lines Dn and D(n+1) stay constant at zero. As can be conceived, in a picture displayed at any moment, both the sum voltage of every two adjacent data lines, and the sum voltage variation of the two adjacent data lines are zero within the display panel driven under the above drive mode. Thus, the phenomenon of deviation generated due to couplings of the common-electrode voltage Vcom to the data lines can be largely relieved, thus eliminating horizontal crosstalk caused thereby.

However, it can be readily understood that the above embodiment is not construed as limitations of the present disclosure. For example, more than two data lines can be provided for each line of pixels, with the scan lines being alternately connected to each successive pixel in a corresponding line. Each line of pixels is scanned in a plurality of individual time periods, the number of which is generally the same as that of the corresponding scan lines. During each time period, when pixel drive signals are input into pixels connected to one of the scan lines via corresponding data lines, the sum of the variation of the pixel drive signals and the variation of input signals of data lines corresponding to pixels connected to the rest of the scan lines equals zero, so that a common electrode voltage will not deviate from a pre-determined voltage.

In addition, it is preferred that at least two scan lines are arranged successively in parallel with each other from the top down, and are alternately connected, in an order as arranged, to each successive pixel located in a corresponding line. For example, when three scan lines are provided for each line of pixels, they can be respectively termed as a first scan line, a second scan line, and a third scan line. With reference to a first line of pixels, the first scan line, the second scan line, and the third scan line can to be connected to pixel n, pixel n+1, and pixel n+2 located in this line respectively. The first line of pixels will be scanned in three individual time periods. During a first time period, a scan signal is exerted on the first scan line, and all TFTs connected thereto are activated, while all TFTs connected to the second and third scan lines are deactivated. At this moment, pixel n connected to the first scan line is being charged via data line n, while the sum voltage exerted on data lines n+1 and n+2 respectively corresponding to the pixels n+1 and n+2 located in this line has a same amplitude but an opposite polarity with respect to the voltage exerted on data line n. Similar steps can be performed in other time periods and therefore will not be repeated herein. Through this configuration, liquid crystal display panels can be manufactured with reduced complexity, and the layout of panels can be provided with enhanced homogeneity. Moreover, scan lines can be driven in a simplified configuration.

Moreover, the liquid crystal display panel according to the embodiment of the present disclosure can be driven not only by the column reversion drive mode as described above, but also by the drive modes of line reversion, frame reversion, and dot reversion. Furthermore, the phenomenon of horizontal crosstalk can be effectively eliminated in the liquid crystal display panel according to the embodiment of the present disclosure regardless of which drive mode is used.

To conclude the foregoing, the embodiment of the present disclosure provides a liquid crystal display panel, wherein at least one scan line is added for each line of pixels, i.e., at least two scan lines are provided for each line of pixels. The at least two scan lines are alternately connected to each successive pixel located in a corresponding line, with each line of pixels being scanned in a plurality of individual time periods. During each time period, when pixel drive signals are input into pixels connected to one of the at least two scan lines via corresponding data lines, the sum of the variation of the pixel drive signals and the variation of input signals of data lines corresponding to pixels connected to the rest of the at least two scan lines equals zero, so that a common electrode voltage will not deviate from a pre-determined voltage. As a result of this, the phenomenon of deviation generated due to couplings of the common-electrode voltage to the data lines can be largely relieved, thus eliminating the phenomenon of horizontal crosstalk caused thereby in the prior art.

In addition, the present disclosure further provides a liquid crystal display, which comprises the liquid crystal display panel as described above.

The above description should not be construed as limitations of the present disclosure, but merely as exemplifications of preferred embodiments thereof. Any variations or replacements that can be readily envisioned by those skilled in the art are intended to be within the scope of the present disclosure.

The invention claimed is:

1. A liquid crystal display panel, comprising:
a plurality of pixels configured in an array, which is formed by a plurality of data lines and a plurality of scan lines that are arranged perpendicularly with respect to the plurality of data lines, wherein the plurality of scan lines comprise:
at least two scan lines arranged in correspondence with each line of pixels, the at least two scan lines being alternately connected to each successive pixel located in a corresponding line, wherein each line of pixels is scanned in a plurality of individual time periods, during which, when a scan-line signal is exerted on one of the at least two scan lines and pixel drive signals are input into pixels connected to the one of the at least two scan lines via corresponding data lines in each time period, a sum of the pixel drive signals and a sum of input signals of data lines corresponding to pixels connected to the rest of the at least two scan lines having no scan-line signals applied, have same amplitudes but opposite polarities, so that a common electrode voltage will not deviate from a pre-determined voltage.

2. The liquid crystal display panel according to claim 1, wherein the at least two scan lines are arranged successively in parallel with each other from the top down, and are alternately connected, in an order as arranged, to each successive pixel located in a corresponding line.

3. The liquid crystal display panel according to claim 1, wherein two scan lines are provided for each line of pixels, and
the scan time for each line of pixels comprises two time periods, during which, when pixel drive signals are input into pixels connected to either of the two scan lines via corresponding data lines in each of the two time periods, the sum of input signals of data lines corresponding to pixels connected to the other of the two scan lines has a same amplitude but an opposite polarity with respect to the sum of the pixel drive signals.

4. The liquid crystal display panel according to claim 3, wherein either of the two scan lines corresponding to a line of pixels is connected to odd-numbered pixels located in said line of pixels, while the other of the two scan lines is connected to even-numbered pixels located in said line of pixels.

5. The liquid crystal display panel according to claim 1, wherein the liquid crystal display panel can be driven through a column reversion drive mode, a line reversion drive mode, a frame reversion drive mode, and a dot reversion drive mode.

6. A liquid crystal display, comprising a liquid crystal display panel, which has a plurality of pixels configured in an array, the array being formed by a plurality of data lines and a plurality of scan lines that are arranged with respect to the plurality of data lines, wherein the plurality of scan lines comprise:

at least two scan lines arranged in correspondence with each line of pixels, the at least two scan lines being alternately connected to each successive pixel located in a corresponding line, wherein each line of pixels is scanned in a plurality of individual time periods, during which, when a scan-line signal is exerted on one of the at least two scan lines and pixel drive signals are input into pixels connected to the one of the at least two scan lines via corresponding data lines in each time period, a sum of the pixel drive signals and a sum of input signals of data lines corresponding to pixels connected to the rest of the at least two scan lines having no scan-line signals applied, have same amplitudes but opposite polarities, so that a common electrode voltage will not deviate from a pre-determined voltage.

7. The liquid crystal display according to claim 6, wherein the at least two scan lines are arranged successively in parallel with each other from the top down, and are alternately connected, in an order as arranged, to each successive pixel located in a corresponding line.

8. The liquid crystal display according to claim 6, wherein two scan lines are provided for each line of pixels, and the scan time for each line of pixels comprises two time periods, during which, when pixel drive signals are input into pixels connected to either of the two scan lines via corresponding data lines in each of the two time periods, the sum of input signals of data lines corresponding to pixels connected to the other of the two scan lines has a same amplitude but an opposite polarity with respect to the sum of the pixel drive signals.

9. The liquid crystal display according to claim 8, wherein either of the two scan lines corresponding to a line of pixels is connected to odd-numbered pixels located in said line of pixels, while the other of the two scan lines is connected to even-numbered pixels located in said line of pixels.

10. The liquid crystal display according to claim 6, wherein the liquid crystal display panel can be driven through a column reversion drive mode, a line reversion drive mode, a frame reversion drive mode, and a dot reversion drive mode.

* * * * *